(12) United States Patent
Matsuda (10) Patent No.: US 9,764,647 B2
(45) Date of Patent: Sep. 19, 2017

(54) MAIN CONVERSION DEVICE FOR ELECTRIC VEHICLE (71) Applicant: Kotaro Matsuda, Tokyo (JP)

(72) Inventor: Kotaro Matsuda, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 289 days.

(21) Appl. No.: 14/655,023

(22) PCT Filed: Mar. 6, 2013

(86) PCT No.: PCT/JP2013/056139
§ 371 (c)(1),
(2) Date: Jun. 23, 2015

(87) PCT Pub. No.: WO2014/136220
PCT Pub. Date: Sep. 12, 2014

(65) Prior Publication Data
US 2015/0343907 A1 Dec. 3, 2015
US 2016/0185229 A2 Jun. 30, 2016

(51) Int. Cl.
B60L 9/24 (2006.01)
B60L 7/14 (2006.01)
(Continued)

(52) U.S. Cl.
CPC .......... B60L 9/24 (2013.01); B60L 1/00 (2013.01); B60L 1/003 (2013.01); B60L 5/00 (2013.01);
(Continued)

(58) Field of Classification Search
CPC .. B60L 9/24; B60L 15/00; B60L 15/20; B60L 15/2009
See application file for complete search history.

(56) References Cited

U.S. PATENT DOCUMENTS 5,642,020 A 6/1997 Miyazaki
2009/0267412 A1* 10/2009 Kitanaka ............... B60L 3/0007
307/10.7
(Continued)

FOREIGN PATENT DOCUMENTS

JP 07-123501 A 5/1995
JP 10-229683 A 8/1998
(Continued)

OTHER PUBLICATIONS

International Search Report (PCT/ISA/210) mailed on May 7, 2013, by the Japanese Patent Office as the International Searching Authority for International Application No. PCT/JP2013/056139.
(Continued)

Primary Examiner — Jeffrey Shin
(74) Attorney, Agent, or Firm — Buchanan Ingersoll & Rooney PC (57) ABSTRACT The first power converter is connected with a circuit connected with an overhead line, and an intermediate link, and mutually converts power. The second power converter is connected with the intermediate link, and a circuit electrically connected with an induction motor, and mutually converts power. The auxiliary power-supply device receives power from the intermediate link, and supplies power to a load. The operation controller controls the operation/deactivation of the first power converter based on acceleration and speed of a vehicle, auxiliary source power, and a restriction value for regenerative power to the overhead line in such a way that the power to be supplied to the auxiliary power-supply device becomes equal to or larger than the auxiliary source power, and the regenerative power flowing to the overhead line 105 becomes equal to or smaller than the restriction value.

11 Claims, 8 Drawing Sheets (51) Int. Cl.
*B60L 1/00* (2006.01)
*B60L 5/00* (2006.01)
*B60L 7/02* (2006.01)
*B60L 9/28* (2006.01)

(52) U.S. Cl.
CPC *B60L 7/02* (2013.01); *B60L 7/14* (2013.01); *B60L 9/28* (2013.01); *B60L 2200/26* (2013.01); *B60L 2200/30* (2013.01)

(56) References Cited

U.S. PATENT DOCUMENTS

| | | | |
|---|---|---|---|
| 2010/0060212 A1* | 3/2010 | Negoro | B60L 7/14 318/400.3 |
| 2010/0207560 A1* | 8/2010 | Itoh | B60L 9/24 318/400.25 |
| 2011/0276214 A1 | 11/2011 | Matsumoto | |
| 2012/0086369 A1 | 4/2012 | Kitanaka et al. | |
| 2012/0296507 A1 | 11/2012 | Matsumoto | |

FOREIGN PATENT DOCUMENTS

| | | |
|---|---|---|
| JP | 2012-023903 A | 2/2012 |
| WO | WO 2010/109607 A1 | 9/2010 |
| WO | WO 2011/007430 A1 | 1/2011 |
| WO | WO 2011/070609 A1 | 6/2011 |

OTHER PUBLICATIONS

Written Opinion (PCT/ISA/237) mailed on May 7, 2013, by the Japanese Patent Office as the International Searching Authority for International Application No. PCT/JP2013/056139.

* cited by examiner

MAIN CONVERSION DEVICE FOR ELECTRIC VEHICLE

TECHNICAL FIELD

The present disclosure relates to a main conversion device loaded on an electric motor car.

BACKGROUND ART

Electric circuits for an electric motor car include a main circuit that supplies power to an electric motor, and an auxiliary circuit that supplies power to auxiliary devices, such as an air conditioner for the interior of the vehicle, and lighting devices.

In the case of AC electric motor cars that run upon reception of AC power supply from an overhead line, at the time of power running, the AC power supplied from the overhead line is sequentially converted by a main transformer and a main conversion device both constructing the main circuit, and is output to the electric motor. Hence, the power is converted to motion energy, and thus electric motor cars can run.

Typically, this main conversion device includes first and second power converters, and an intermediate link that electrically connects those converters. At the time of power running, the first power converter converts AC power output by the main transformer to DC power, and outputs this DC power to the intermediate link. The second power converter converts, at the time of power running, the DC power supplied from the intermediate link to AC power, and outputs this AC power to the electric motor.

An auxiliary power-supply device (APS) that is the power source for the auxiliary circuit is connected with the main circuit to receive power.

Typically, the auxiliary power-supply device provided separately from the main conversion device is directly connected with the main transformer. In this case, the power supplied from the overhead line is supplied to both main conversion device and auxiliary power-supply device through the main transformer.

Conversely, an auxiliary power-supply device integrally provided with the main conversion device is typically connected with the intermediate link in the main conversion device (see, for example, Patent Literature 1). In this case, the power supplied from the overhead line is supplied to both second power converter and auxiliary power-supply device through the main transformer and the first power converter.

Meanwhile, in recent years, there are electric motor cars which utilize, at the time of braking, the electric motor as a power generator to convert the motion energy of the vehicle to power through the main circuit thereby causing regenerative power to flow to the overhead line. The regenerative power to the overhead line results in the reduction of power consumption, but the regenerative power generated by the electric motor often contains harmonic components. Because of the reasons such that the transformer of a transforming station is not compatible with such harmonic components, regenerative power to the overhead line is sometimes restricted to be equal to or smaller than a predetermined value (including zero).

In the case of the auxiliary power-supply device that is separately provided from the main conversion device, the main conversion device and the auxiliary power-supply device can operate independently. Hence, when regenerative power to the overhead line is restricted, the operation of the first power converter is terminated, and thus the regenerative power flowing to the overhead line is shut down. Hence, the adverse effects of harmonic components to the transforming station can be avoided. Even if the first power converter is deactivated, the auxiliary power-supply device can receive power supply from the overhead line through the main transformer, and thus the auxiliary power-supply device can continuously supply power to the auxiliary devices.

CITATION LIST

Patent Literature

Patent Literature 1: International Publication No. WO 2010/109607

SUMMARY OF INVENTION

Technical Problem

However, according to the auxiliary power-supply device that is provided integrally with the main conversion device, however, although the total size of the main conversion device and the auxiliary power-supply device can be made compact, the auxiliary power-supply device sometimes operates depending on the operation of the main conversion device.

When, for example, the regenerative power flowing to the overhead line is restricted, if the first power converter is deactivated, like the case of the auxiliary power-supply device that is provided separately from the main conversion device, the regenerative power flowing to the overhead line can be cut. Hence, the adverse effects of harmonic component to the transforming station can be avoided. However, while the first power converter is deactivated, the regenerative power generated by the electric motor can be supplied to the auxiliary power-supply device, but the power from the overhead line cannot be supplied thereto. Accordingly, when necessary power to operate the auxiliary device exceeds the regenerative power, the auxiliary power-supply device becomes unable to receive sufficient power. Consequently, the auxiliary power-supply device may be shutdown, and power supply to the auxiliary devices may be terminated.

The present disclosure has been made in view of the aforementioned circumstances, and it is an objective of the present disclosure to provide a main conversion device for electric motor cars that can restrict regenerative power flowing to an overhead line without shutting down an auxiliary power-supply device.

Solution to Problem

To accomplish the above objective, a main conversion device for an electric motor car according to the present disclosure includes a first power converter, a second power converter, an auxiliary power-supply device, and an operation controller.

The first power converter is connected with a circuit with an overhead line through which an AC current flows, and an intermediate link that is a circuit through which a DC current flows, and the first power converter mutually converts AC power and DC power. The second power converter is connected with the intermediate link, and a circuit with an electric motor through which the AC current flows, and the second power converter mutually converts the DC power and the AC power. The auxiliary power-supply device receives power from the intermediate link, and supplies the power to a load. The operation controller controls an operation/deactivation of the first power converter based on a value indicating an acceleration condition of the vehicle, a value in accordance with a vehicle speed, auxiliary source power that is necessary power for the auxiliary power-supply device to supply the power to the load, and a restriction value for regenerative power flowing to the overhead line in such a way that the power to be supplied to the auxiliary power-supply device becomes equal to or larger than the auxiliary source power, and the regenerative power flowing to the overhead line becomes equal to or smaller than the restriction value.

Advantageous Effects of Invention

According to the present disclosure, it becomes possible to restrict regenerative power flowing to an overhead line without shutting down an auxiliary power-supply device.

DESCRIPTION OF EMBODIMENTS

Embodiments of the present disclosure are explained below with reference to the accompanying figures. The same element throughout all figures are denoted by the same reference sign.

Embodiment 1

Figure 1:
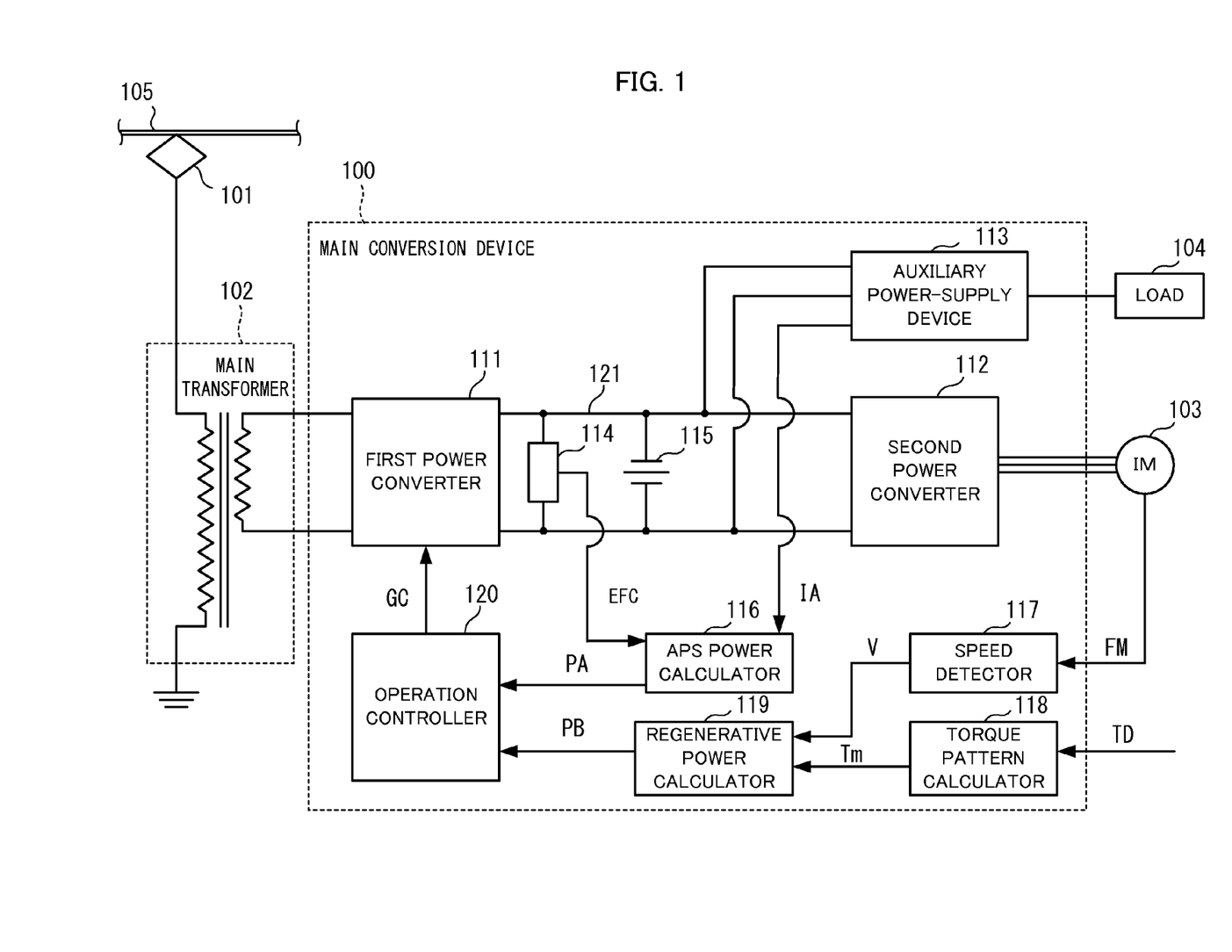
FIG. 1 is a diagram illustrating a structure of a main conversion device according to Embodiment 1 of the present disclosure.

A main conversion device (vehicular main conversion device) 100 according to Embodiment 1 of the present disclosure is a device that constructs an electric system in an electric motor car together with, as illustrated in FIG. 1, a pantograph 101, a main transformer 102, an induction motor (IM) 103, a load 104, and the like.

The pantograph 101 exchanges power with an overhead line 105 that are to supply AC power to the electric motor car. The main transformer 102 is electrically connected with the pantograph 101 and the main conversion device 100, and converts bidirectionally an input voltage to a predetermined voltage, and outputs this voltage. The induction motor 103 is an electric motor that exchanges power with the main conversion device 100, converts, at the time of power running, power supplied from the main conversion device 100 to motion energy, and outputs this energy. At the time of braking, the induction motor converts the motion energy to regenerative power, and outputs this regenerative power to the main conversion device 100. The load 104 is auxiliary devices that operate upon reception of power supply from the main conversion device 100, and includes, for example, an air conditioner for the interior of the vehicle, and a lighting device. Note that multiple loads 104 may be provided.

The main conversion device 100 is a device which converts input power in accordance with an input signal or instruction, and which outputs the converted power. As illustrated in the figure, the main conversion device includes a first power converter 111, a second power converter 112, an auxiliary power-supply device (APS) 113, a voltage detector (DCPT) 114, a filter capacitor 115, an APS power calculator 116, a speed detector 117, a torque pattern calculator 118, a regenerative power calculator 119, and an operation controller 120.

The first power converter 111 is provided between the main transformer 102 and an intermediate link 121. This intermediate link 121 is a circuit that forms a circuit through which a DC current flows between the first power converter 111 and the second power converter 112, and includes, for example, lead wires.

The first power converter 111 switches the operation/deactivation in accordance with an operation control signal GC from the operation controller 120 to be discussed later in detail. At the time of operation, the first power converter 111 mutually converts AC power and DC power, and outputs the converted power.

More specifically, at the time of operation, when AC power is input from the main transformer 102 to the first power converter 111, the first power converter 111 converts this input power to DC power, and outputs this DC power to the intermediate link 121. At the time of operation, when DC power is input from the intermediate link 121 to the first power converter 111, the first power converter 111 converts this input power to AC power, and outputs this AC power to the main transformer 102.

The second power converter 112 that is provided between the intermediate link 121 and the induction motor 103, mutually converts DC power and AC power, and outputs the converted power.

More specifically, when DC power is input from the intermediate link 121 to the second power converter 112, the second power converter 112 converts this input power to predetermined AC power (for example, three-phase AC power) under the control of an unillustrated controller, and outputs this AC power to the induction motor 103. When regenerative power (AC power) is input from the induction motor 103 to the second power converter 112, the second power converter 112 converts this input power to DC power, and outputs this DC power to the intermediate link 121.

The auxiliary power-supply device 113 is electrically connected with the intermediate link 121, receives DC power from the intermediate link 121, and supplies the power to the load 104. While receiving, from the intermediate link 121, auxiliary source power PA that is necessary power to supply power to the load, the auxiliary power-supply device 113 keeps operating, thereby enabling continuous power supply to the load 104. When a state in which the power being received from the intermediate link 121 is smaller than the auxiliary source power PA continues for some extent of time, the auxiliary power-supply device 113 becomes unable to supply sufficient power to the load 104, and then shuts down. Consequently, there is a possibility that the load 104 is also deactivated.

The voltage detector 114 is a device which detects an intermediate link voltage EFC that is a voltage at the intermediate link 121, and which outputs an EFC signal containing information on the detected intermediate link voltage.

The filter capacitor 115 is a capacitor to stabilize the intermediate link voltage EFC, and is connected with the intermediate link 121.

The APS power calculator 116 calculates the auxiliary source power PA, and outputs a PA signal containing the calculated auxiliary source power PA.

For example, the APS calculator 116 calculates the auxiliary source power PA that is power supplied to the auxiliary power-supply device 113. More specifically, the APS power calculator 116 obtains the EFC signal from the voltage detector 114. The APS power calculator 116 obtains an APS current signal that contains information on an APS current IA with the value of the current flowing in the auxiliary power-supply device 113. The APS power calculator 116 calculates a product of the intermediate link voltage EFC and the APS current IA. Accordingly, the power supplied to the auxiliary power-supply device 113 can be calculated.

The speed detector 117 detects a vehicle speed V, and outputs a speed signal that contains information on the detected vehicle speed V.

More specifically, the speed detector 117 obtains a signal containing information on revolutions FM of the induction motor 103 per a unit of time. The speed detector 117 applies the revolutions FM contained in the signal to, for example, a relational expression defined appropriately in accordance with a vehicle, thereby detecting the vehicle speed V.

The torque pattern calculator 118 calculates, upon reception of an external operation instruction TD, a torque instruction value Tm based on the external operation instruction TD, and outputs a torque instruction containing the calculated torque instruction value Tm.

The regenerative power calculator 119 calculates regenerative power PB to be generated by the induction motor 103 based on a value indicating the acceleration condition of the vehicle and a value in accordance with the vehicle speed. The regenerative power calculator 119 outputs a regenerative power signal containing the calculated regenerative power PB.

For example, the torque instruction value Tm is applied as the value indicating the acceleration condition of the vehicle, and the vehicle speed V is applied as the value in accordance with the vehicle speed. More specifically, the regenerative power calculator 119 obtains the torque instruction from the torque pattern calculator 118. The regenerative power calculator 119 obtains the speed signal from the speed detector 117. For example, the regenerative power calculator 119 performs a calculation that is 3.6×torque instruction value Tm×vehicle speed V, thereby calculating the regenerative power PB to be generated by the induction motor 103.

The operation controller 120 controls the operation/deactivation of the first power converter 111 based on the auxiliary source power PA, and the regenerative power PB that is calculated based on the torque instruction value Tm and the vehicle speed V when regenerative power flowing to the overhead line 105 is restricted. The operation controller 120 controls the operation/deactivation of the first power converter 111 in such a way that power to be supplied to the auxiliary power-supply device 113 becomes equal to or larger than the auxiliary source power PA, and the regenerative power flowing to the overhead line 105 becomes equal to or smaller than a restriction value Ps1.

In this case, the restriction value Ps1 is a value which is equal to or greater than zero and which is set by, for example, a transforming station that supplies power to the overhead line 105 across the running territory. When the restriction value Ps1 is zero, this means that the flow of regenerative power to the overhead line 105 is prohibited. For example, the restriction value Ps1 may be set to the operation controller 120 as needed through an unillustrated input device, and the operation controller 120 may store data representing the restriction value Ps1.

Figure 2:
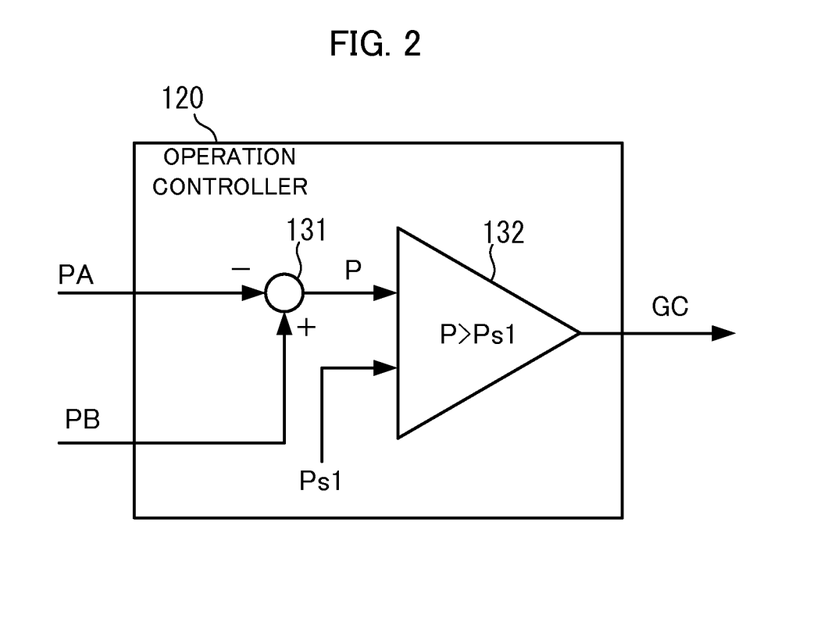
FIG. 2 is a diagram illustrating a structure of an operation controller according to Embodiment 1.

More specifically, as is illustrated in the circuit diagram of FIG. 2, the operation controller 120 includes a subtractor 131 and a comparator 132.

As illustrated in the figure, the subtractor 131 obtains the PA signal from the APS power calculator 116, and also obtains the regenerative power signal from the regenerative power calculator 119. The subtractor 131 subtracts the auxiliary source power PA contained in the PA signal from the regenerative power PB contained in the regenerative power signal, thereby calculating a difference P(=PB−PA) between the auxiliary source power PA and the regenerative power PB.

The comparator 132 compares the difference P contained in an output signal by the subtractor 131 with the restriction value Ps1 stored by the operation controller 120. The comparator 132 outputs an operation control signal GC in accordance with the comparison result to the first power converter 111.

Figure 3:
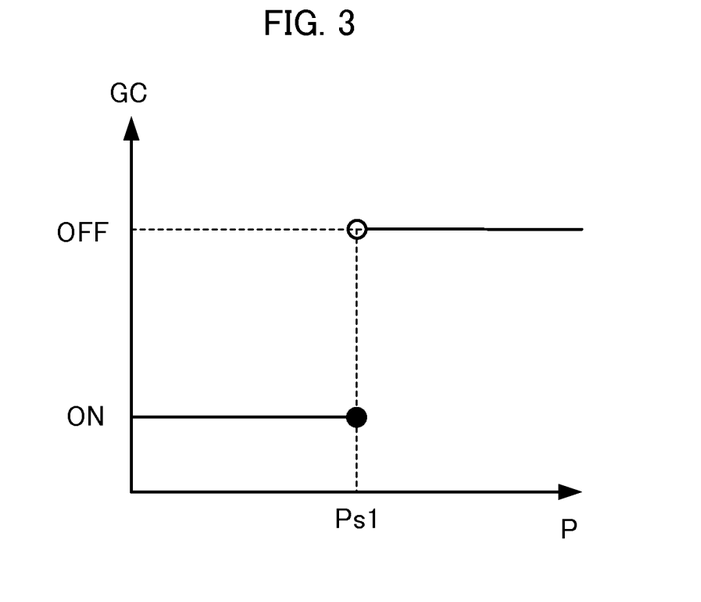
FIG. 3 is a diagram illustrating a relationship between an operation control signal output by the operation controller and power P obtained by subtracting auxiliary source power PA from regenerative power PB according to Embodiment 1.

More specifically, when the difference P is larger than the restriction value Ps1, it corresponds to the case P>Ps1 in FIG. 3. In this case, as illustrated in the figure, the comparator 132 generates an operation control signal GC (OFF-operation control signal GC) to deactivate the first power converter 111, and outputs this signal to the first power converter 111. Hence, the first power converter 111 deactivates. Consequently, the regenerative power generated by the induction motor 103 is not supplied to the overhead line 105.

When the difference P is equal to or smaller than the restriction value Ps1, it corresponds to the case P≤Ps1 in FIG. 3. In this case, as illustrated in the figure, the comparator 132 generates an operation control signal GC (ON-operation control signal GC) to operate the first power converter 111, and outputs this signal to the first power converter 111. Hence, the first power converter 111 operates. Consequently, the regenerative power generated by the induction motor 103 is supplied to the auxiliary power-supply device 113, and if there is surplus power, the surplus power is made to flow to the overhead line 105.

The functions of the speed detector 117, the APS power calculator 116, the torque pattern calculator 118, the regenerative power calculator 119, and the operation controller 120 may be realized by, for example, a processor, a RAM (Random Access Memory), a ROM (Read Only Memory), and the like which cooperatively work together and which execute a pre-installed computer program. In this case, respective numbers of the processors, the RAMS, and the ROMs may be one or a multiple number.

Up to this paragraph, the explanation is given of the structure of the main conversion device 100 of Embodiment 1. Next, an operation of the main conversion device 100 of Embodiment 1 is explained.

At the time of power running, AC power is taken by the main transformer 102 from the overhead line 105 through the pantograph 101. The main transformer 102 converts a voltage, and outputs AC power with a converted voltage. Since the first power converter 111 is operating in the power running, the first power converter converts the AC power output by the main transformer 102 to DC power, and outputs this DC power to the intermediate link 121.

The auxiliary power-supply device 113 and the second power converter 112 receive the DC power output by the first power converter 111 through the intermediate link 121. The auxiliary power-supply device 113 supplies the received power to the load 104. The second power converter 112 converts the received DC power, and outputs the converted power to the induction motor 103. At this time, power in accordance with the details of a power-running instruction is output to the induction motor 103 from the second power converter 112. This enables the electric motor car to, for example, accelerate and run at a constant speed.

At the time of braking, that is, while the induction motor 103 is generating regenerative power, the induction motor 103 serves as a power generator, and generates AC power (regenerative power). The second power converter 112 receives the regenerative power generated by the induction motor 103, converts this power to DC power, and outputs this DC power to the intermediate link 121. The auxiliary power-supply device 113 receives the DC power output by the second power converter 112 through the intermediate link 121, and supplies the received power to the load 104.

When the regenerative power PB generated by the induction motor 103 is equal to or smaller than the auxiliary source power PA, the difference P becomes equal to or smaller than zero, that is, becomes equal to or smaller than the restriction value Ps1. Hence, the operation controller 120 outputs the ON-operation control signal GC, thereby causing the first power converter 111 to operate. Accordingly, the first power converter 111 operates like the case of the power running explained above. Consequently, power from the overhead line 105 is supplied to the auxiliary power-supply device 113 through the main transformer 102 and the first power converter 111, and thus the power supplied to the auxiliary power-supply device 113 becomes equal to or larger than the auxiliary source power PA.

When the regenerative power PB generated by the induction motor 103 is larger than the auxiliary source power PA, and the difference P is equal to or smaller than the restriction value Ps1, the operation controller 120 outputs the ON-operation control signal GC, thereby causing the first power converter 111 to operate. Accordingly, the first power converter 111 receives, from the intermediate link 121, power corresponding to the difference P, converts this power to AC power, and outputs the converted power. The main transformer 102 receives the AC power output by the first power converter 111, converts the voltage, and outputs the AC power. The power output by the main transformer 102 is made to flow to the overhead line 105 through the pantograph 101.

When the regenerative power PB generated by the induction motor 103 is larger than the auxiliary source power PA and the difference P is larger than the restriction value Ps1, the operation controller 120 outputs the OFF-operation control signal GC. Accordingly, the first power converter 111 is deactivated. Consequently, no regenerative power flows to the overhead line 105.

According to such a main conversion device 100, power equal to or larger than the auxiliary source power PA is supplied to the auxiliary power-supply device 113. Hence, it becomes possible to prevent the auxiliary power-supply device 113 from terminating the operation thereof. Also, it becomes possible to restrict regenerative power flowing to the overhead line 105 to be equal to or smaller than the restriction value Ps1. Still further, since the regenerative power generated by the induction motor 103 is supplied to the auxiliary power-supply device 113, power consumption by the electric motor car can be reduced.

Up to this paragraph, Embodiment 1 of the present disclosure is explained, but the following modifications may be made to Embodiment 1.

For example, according to Embodiment 1, the value indicating the acceleration condition of the vehicle is the torque instruction value Tm, but the value indicating the acceleration condition of the vehicle may be a gradual value or a successive value contained in, for example, a notch instruction, or may be braking force BE [kN] contained in a brake signal. When the brake signal is employed, the regenerative power PB to be generated by the induction motor 103 can be calculated by, for example, a calculation that is braking force BE [kN]×vehicle speed V [km/h]/3.6.

For example, according to Embodiment 1, the value in accordance with the vehicle speed is the vehicle speed V. However, the value in accordance with the vehicle speed may be, for example, the rotation speed FM of the induction motor 103.

For example, according to Embodiment 1, the regenerative power PB to be generated by the induction motor 103 is calculated by the regenerative power calculator 119 based on the torque instruction value Tm and the vehicle speed V, but may be calculated by the regenerative power calculator 119 based on the voltage (motor voltage) and current (motor current) of the induction motor 103. In this case, the regenerative power PB to be generated by the induction motor 103 is calculated as, for example, $3\Lambda(1/2) \times$ motor voltage [V] × motor current [A] × power factor × efficiency/1000, where "$\Lambda$" in the formula indicates exponential.

Modified Example 1

Figure 4:
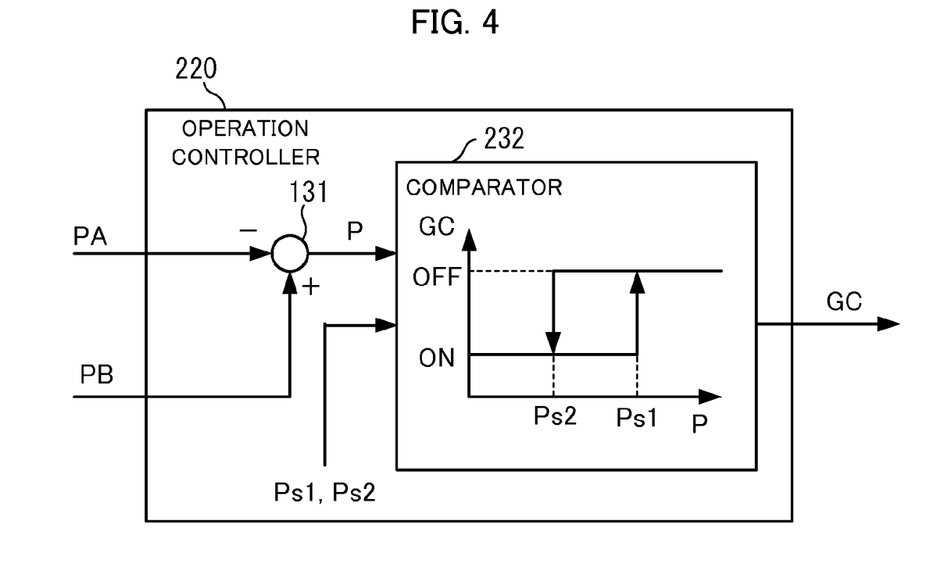
FIG. 4 is a diagram illustrating a structure of an operation controller according to Modified Example 1.

An operation controller 220 according to Modified Example 1 includes, as illustrated in FIG. 4, a comparator 232 instead of the comparator 132 of Embodiment 1. In addition, the operation controller 220 stores, in addition to the restriction value Ps1 of Embodiment 1, data representing a threshold Ps2.

This threshold Ps2 may be a smaller value than Ps1 as needed. The threshold Ps2 is set like the Ps1 explained above, and the operation controller 220 may store data representing the threshold Ps2.

The comparator 232 compares the difference P contained in the output signal by the subtractor 131 with the restriction value Ps1 or the threshold Ps2, and outputs the operation control signal GC in accordance with the comparison result to the first power converter 111, Which one of the restriction value Ps1 and the threshold Ps2 is to be compared with the difference P is determined in accordance with the details of the control output signal GC that is being output.

More specifically, when the ON-operation control signal GC is being output, and when the difference P is equal to or smaller than the restriction value Ps1, the comparator 232 keeps outputting the ON-operation control signal GC. In this case, when the difference P becomes larger than the restriction value Ps1, the comparator 232 switches the ON-operation control signal GC to the OFF-operation control signal GC, and outputs this signal.

When the OFF-operation control signal GC is being output, and when the difference P is larger than the threshold Ps2, the comparator 232 keeps outputting the OFF-operation control signal GC. In this case, when the difference P becomes equal to or smaller than the threshold Ps2, the comparator 232 switches the OFF-operation control signal GC to the ON-operation control signal GC, and outputs this signal.

According to this Modified Example 1, the same advantageous effects as those of Embodiment 1 can be accomplished.

In addition, according to Embodiment 1, when the difference P frequently changes across the restriction value Ps1, the first power converter 111 needs to frequently repeat operation and deactivation. According to this Modified Example, the operation controller 220 switches the ON-operation control signal GC and the OFF-operation control signal GC with reference to different values (restriction value Ps1 and threshold Ps2) in accordance with how the difference P changes. Hence, when the difference P frequently changes across the restriction value Ps1, the first power converter 111 can be prevented from frequently repeating operation and deactivation.

Modified Example 2

Figure 5:
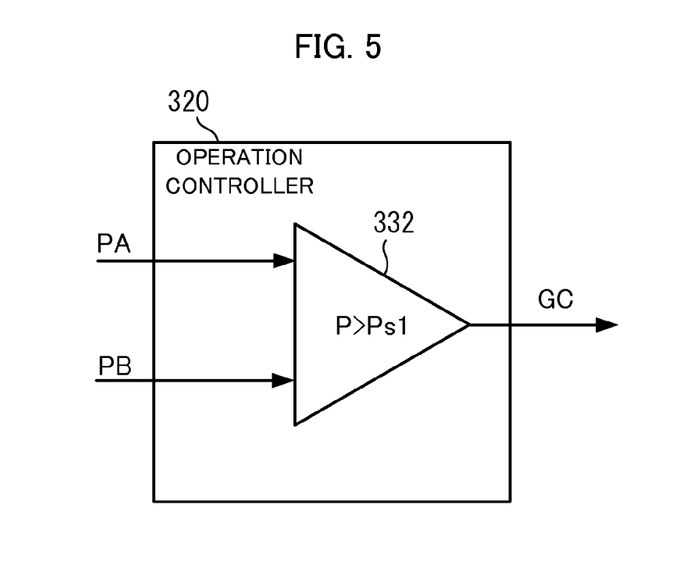
FIG. 5 is a diagram illustrating a structure of an operation controller according to Modified Example 2.

According to Embodiment 1, the operation controller 120 compares the difference P with the restriction value Ps1, and controls the first power converter 111 based on the comparison result. An operation controller 320 of Modified Example 2 includes, as illustrated in FIG. 5, a comparator 332 which compares the regenerative power PB with the auxiliary source power PA, and which controls the first power converter 111 based on the comparison result.

More specifically, the comparator 332 outputs the OFF-operation control signal GC to the first power converter 111 when the regenerative power PB is larger than the auxiliary source power PA, thereby deactivating the first power converter 111. When the reactive power PB is equal to or smaller than the auxiliary source power PA, the comparator 332 outputs the ON-operation control signal GC to the first power converter 111, thereby causing the first power converter 111 to operate.

According to this Modified Example, when the restriction value Ps1 is zero, the same advantageous effects as those of Embodiment 1 can be accomplished. In addition, the structure of the operation controller 320 can be simplified in comparison with that of the operation controller 120 of Embodiment 1.

Embodiment 2

Figure 6:
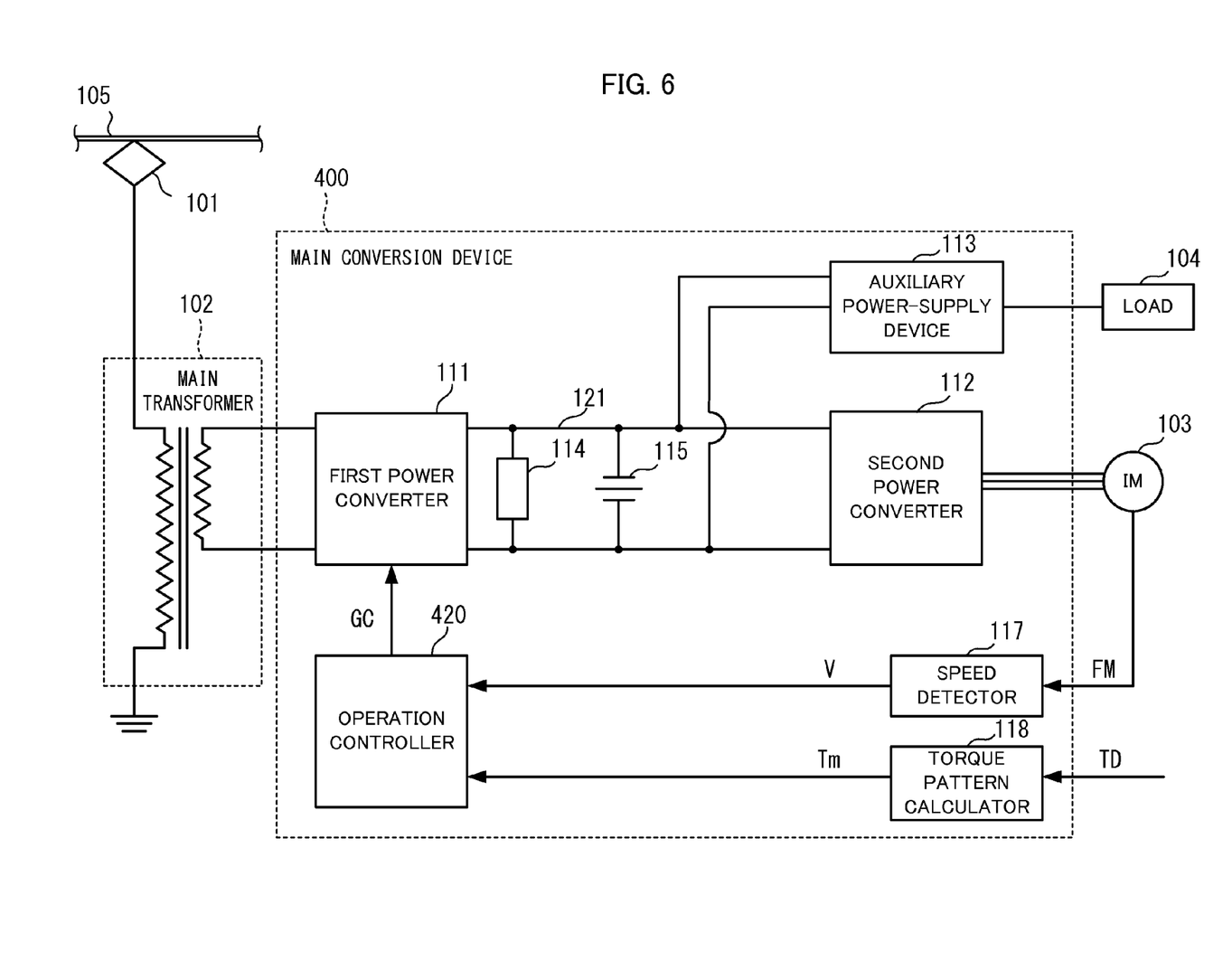
FIG. 6 is a diagram illustrating a structure of a main conversion device according to Embodiment 2 of the present disclosure.

As illustrated in FIG. 6, a main conversion device 400 according to Embodiment 2 of the present disclosure employs the same structure as that of the main conversion device 100 of Embodiment 1 except that the APS power calculator 116 and the regenerative power calculator 119 are omitted, and an operation controller 420 is employed instead of the operation controller 120.

The operation controller 420 controls, like the operation controller 120 of Embodiment 1, the operation/deactivation of the first power converter 111 based on the torque instruction value Tm, the vehicle speed V, the auxiliary source power PA, and the power restriction value Ps1 flowing to the overhead line 105. In addition, the operation controller 420 controls, like the operation controller 120 of Embodiment 1, the operation/deactivation of the first power converter 111 in such a way that power to be supplied to the auxiliary power-supply device 113 becomes equal to or larger than the auxiliary source power PA, and power flowing to the overhead line 105 becomes equal to or smaller than the restriction value Ps1.

The operation controller 420 controls the operation/deactivation of the first power converter 111 based on operation control data that contains an operation control rule which defines whether the first power converter 111 is operated or is deactivated in association with a combination of the torque instruction value Tm and the vehicle speed V.

Figure 7:
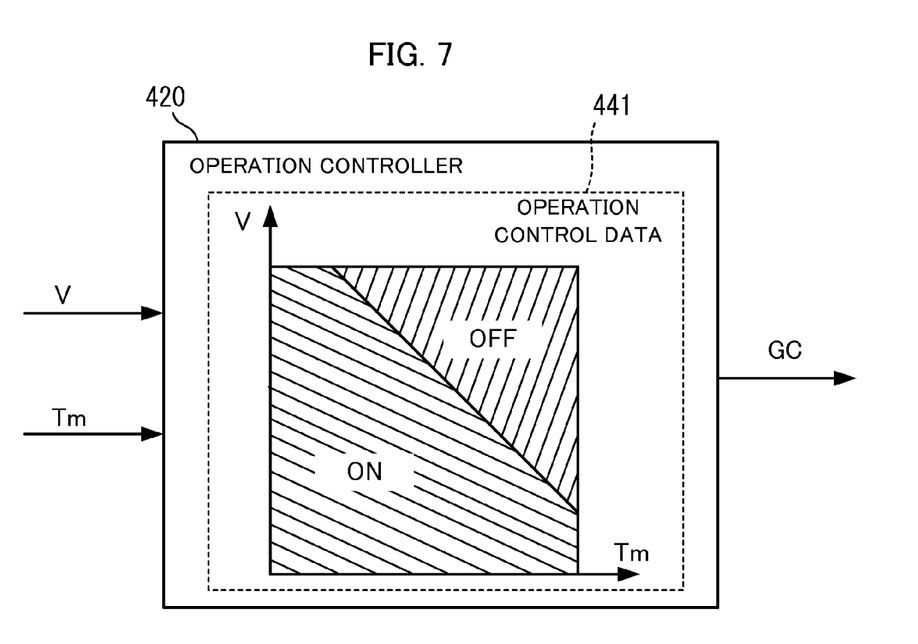
FIG. 7 is a diagram illustrating a structure of an operation controller according to Embodiment 2.

More specifically, as illustrated in FIG. 7, the operation controller 420 stores beforehand operation control data 441 that contains the operation control rule.

The operation control rule associates either the operation of the first power converter 111 or the deactivation thereof with the combination of the torque instruction value Tm and the vehicle speed V.

For example, according to the operation control rule illustrated in the figure, an ON area and an OFF area are prescribed by the torque instruction value Tm and the vehicle speed V. The boundary between the ON area and the OFF area is set in accordance with the preset auxiliary source power PA (for example, a constant value) and the restriction value Ps1.

The operation controller 420 obtains the torque instruction from the torque pattern calculator 118, and obtains the speed signal from the speed detector 117, and, refers to the torque instruction value Tm, the vehicle speed V, and the operation control data 441. Hence, the operation controller 420 determines whether the combination of the torque instruction value Tm and the vehicle speed V belongs to the ON area or to the OFF area.

The operation controller 420 outputs the ON-operation control signal GC to the first power converter 111 when the combination of the torque instruction value Tm and the vehicle speed V contained in the obtained torque instruction and speed signal, respectively, belongs to the ON area. Accordingly, the first power converter 111 operates.

The operation controller 420 outputs the OFF-operation control signal GC to the first power converter 111 when the combination of the torque instruction value Tm and the vehicle speed V contained in the obtained torque instruction and speed signal, respectively, belongs to the OFF area. Accordingly, the first power converter 111 deactivates.

The main conversion device 400 including such an operation controller 420 operates like the main conversion device 100 of Embodiment 1 at the time of power running. This enables the electric motor car to, for example, accelerate and run at a constant speed.

In addition, the second power converter 112 and the auxiliary power-supply device 113 operate like Embodiment 1 at the time of braking. At this time, the operation controller 420 applies, to the operation control rule defined based on the auxiliary source power PA and the restriction value Ps1, the present value of the torque instruction value Tin and that of the vehicle speed V, thereby controlling the operation/deactivation of the first power converter 111.

The regenerative power PB to be generated by the induction motor 103 can be defined by the combination of the torque instruction value Tm and the vehicle speed V. In addition, according to the operation control rule, the boundary between the ON area and the OFF area is defined based on the auxiliary source power PA and the restriction value Ps1.

Hence, according to this Embodiment, by applying the present value of the torque instruction value Tm and that of the vehicle speed V to the operation control rule, the operation/deactivation of the first power converter 111 can be controlled, and thus the same advantageous effects as those of Embodiment 1 can be accomplished.

That is, it becomes possible to prevent the auxiliary power-supply device 113 from terminating the operation thereof. Also, it becomes possible to restrict the regenerative power flowing to the overhead line 105 to be equal to or smaller than the restriction value Ps1. Sill further, since the regenerative power generated by the induction motor 103 is supplied to the auxiliary power-supply device 113, power consumption by the electric motor car can be reduced.

Embodiment 3

Figure 8:
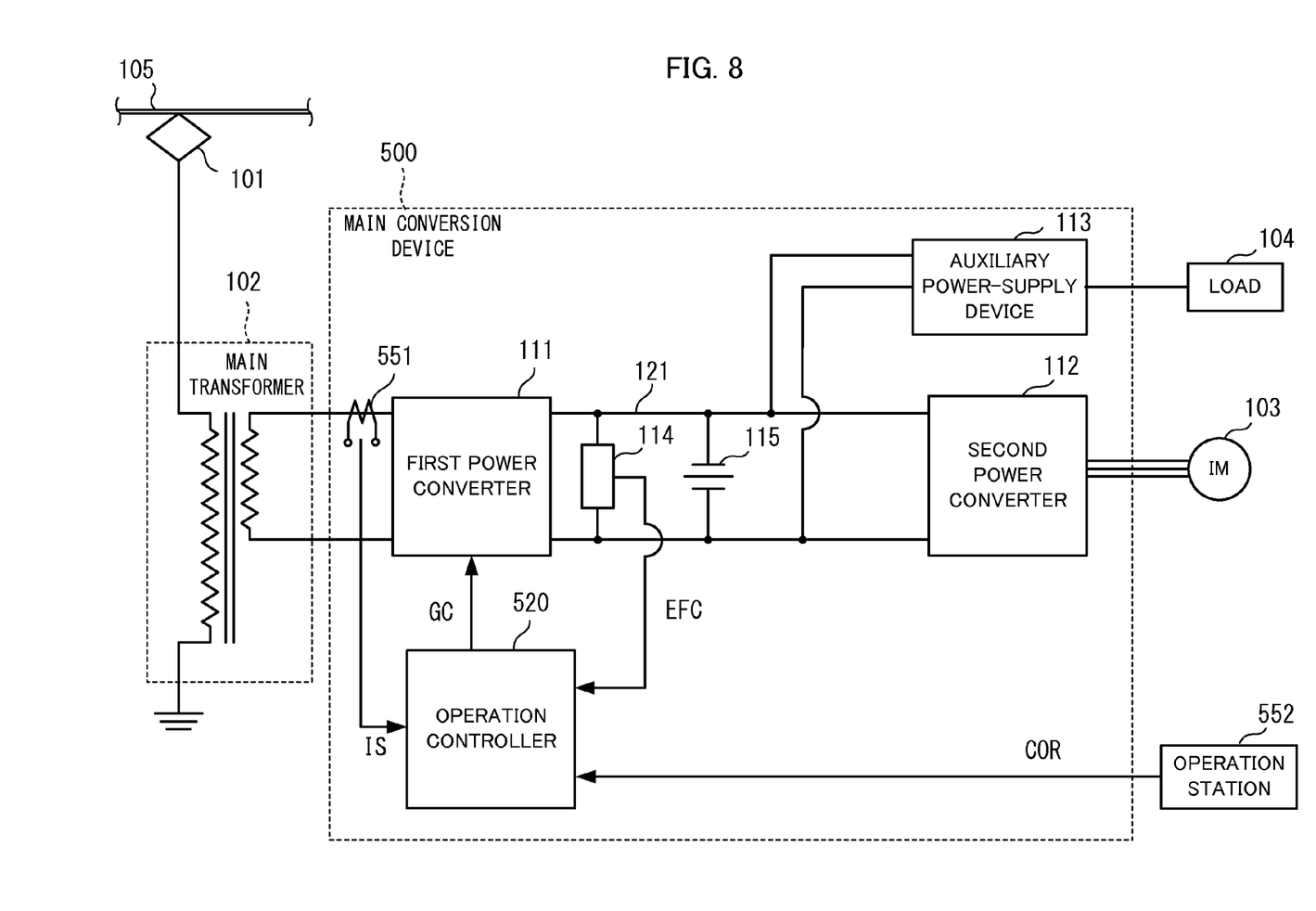
FIG. 8 is a diagram illustrating a structure of a main conversion device according to Embodiment 3 of the present disclosure.

As illustrated in FIG. 8, a main conversion device 500 according to Embodiment 3 of the present disclosure includes, like the main conversion device 100 of Embodiment 1, the first power converter 111, the second power converter 112, the auxiliary power-supply device 113, the voltage detector 114, and the filter capacitor 115. The main conversion device 500 further includes a current detector 551, and an operation controller 520 instead of the operation controller 120 of the main conversion device 100 of Embodiment 1.

The current detector 551 is a device which detects a current input to the first power converter 111, and which outputs an input current signal that contains information on an input current IS that has a detected current value. The current detector 551 of this embodiment detects the magnitude of the current and the direction thereof by indicating the current flowing in a direction toward the first power converter 111 from the pantograph 101 with a positive value, and conversely, indicating the current flowing in the opposite direction with a negative value.

It is sufficient if the direction of the current and the magnitude thereof input to the first power converter 111 are detectable, and the scheme is not limited to the above-explained scheme. For example, the positive/negative notation may be prescribed inversely.

The operation controller 520 controls the operation/deactivation of the first power converter 111 based on a regeneration release instruction COR output by an operation station 552, the intermediate link voltage EFC, and the input current IS.

In this case, the regeneration release instruction COR is an instruction indicating whether the flow of regenerative power to the overhead line 105 is permitted or is restricted. When indicating that the flow of the regenerative power to the overhead line 105 is restricted, the regeneration release instruction COR may contain the restriction value Ps1.

More specifically, the operation controller 520 outputs the OFF-operation control signal GC when obtaining the regeneration release instruction COR indicating that the flow of the regenerative power to the overhead line 105 is restricted. Accordingly, the first power converter 111 is deactivated.

When the intermediate link voltage EFC is equal to or smaller than a setting value Ec (first setting value), since the regenerative power PB generated by the induction motor 103 is equal to or smaller than the auxiliary source power PA, the operation controller 520 outputs the ON-operation control signal GC. This enables the first power converter 111 to operate.

In this case, the setting value Ec is set in advance as the lower limit of the intermediate link voltage EFC that gradually decreases when power supplied to the auxiliary power-supply device 113 is equal to or smaller than the auxiliary source power PA. The setting value Ec is, for example, set to the operation controller 520 through an unillustrated input device as needed, and the operation controller 520 may store data representing the setting value Ec.

When the input current IS contained in the input current signal obtained from the current detector 551 is equal to or smaller than a setting value Ic (second setting value), the operation controller 520 outputs the OFF-operation control signal GC. Accordingly, the first power converter 111 deactivates.

In this case, since the voltage output by the first power converter 111 to the main transformer 102 is substantially constant, the regenerative power flowing to the overhead line 105 can be estimated based on the input current IS. Hence, the input current IS when the regenerative power flowing to the overhead line 105 becomes the restriction value Ps1 is applied as the setting value Ic. Thus, according to this Embodiment, this setting value becomes a negative value.

The setting value Ic is set to, for example, the operation controller 520 through an unillustrated input device as needed, and the operation controller 520 may store data representing the setting value Ic. The setting value Ic may be set by the operation controller 520 that calculates the setting value Ic in accordance with the restriction value Ps1 input through an unillustrated input device.

Up to this paragraph, the structure of the main conversion device 500 of this Embodiment is explained. Next, an explanation is given of an operation of the main conversion device 500 with reference to the figure.

At the time of power running, the main conversion device 500 operates like the main conversion device 100 of Embodiment 1. This enables the electric motor car to, for example, accelerate and run at a constant speed.

Figure 9:
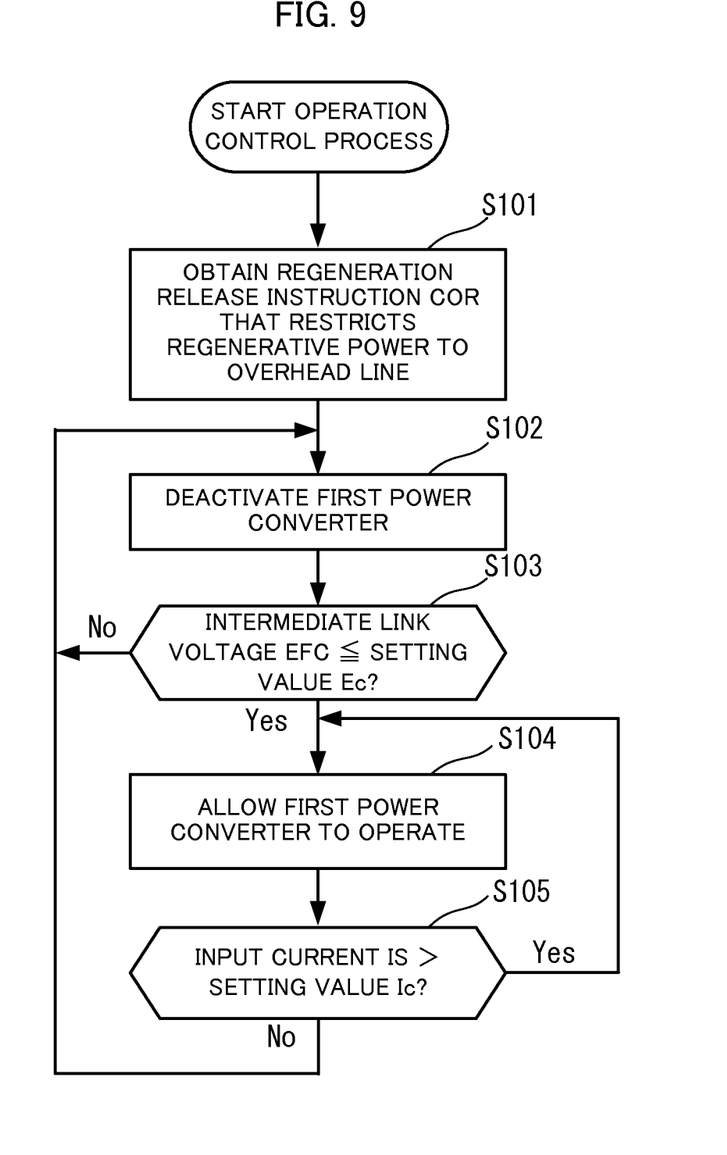
FIG. 9 is a flowchart illustrating a flow of an operation control process according to Embodiment 3.

At the time of braking, the main conversion device 500 executes an operation control process illustrated in FIG. 9.

The operation controller 520 obtains (step S101), from the operation station 552, the regeneration release instruction COR indicating the restriction of the flow of the regenerative power to the overhead line 105.

Figure 10:
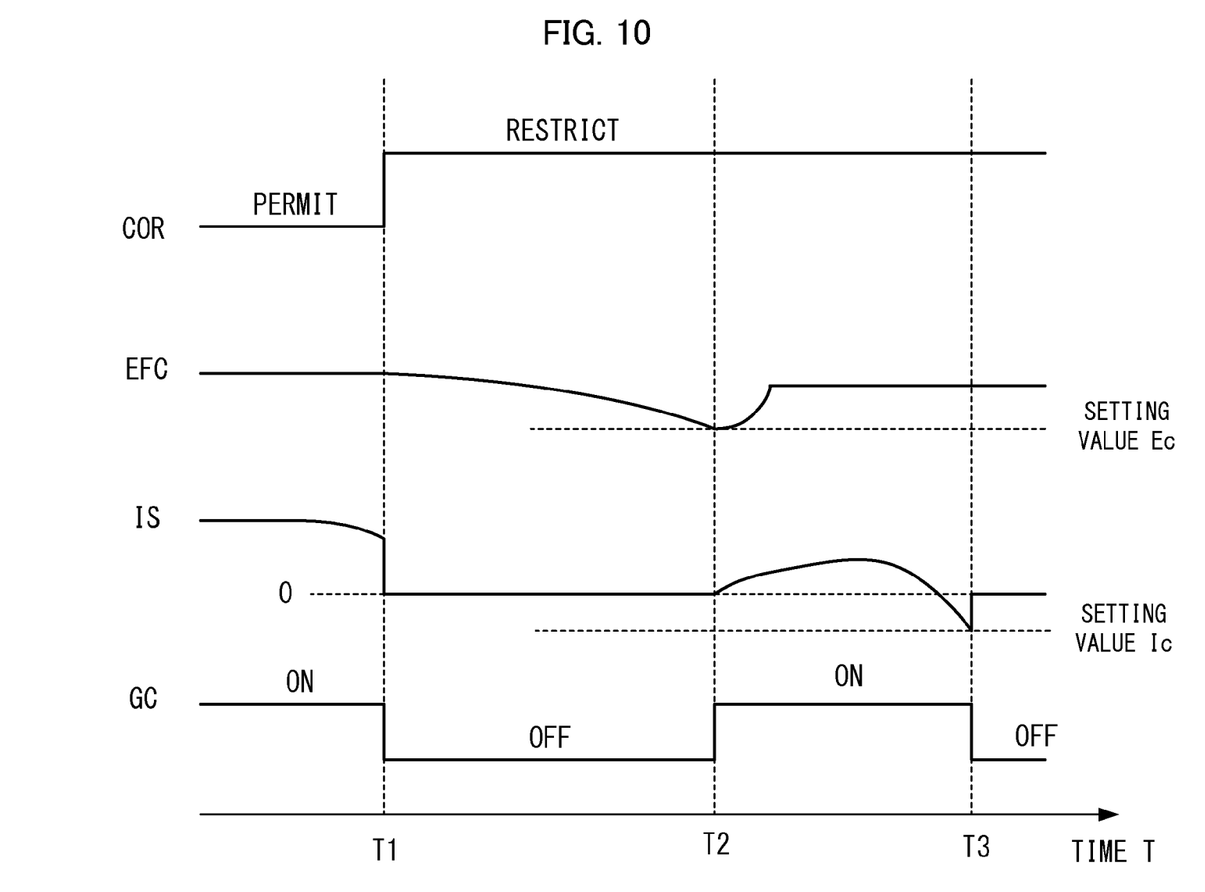
FIG. 10 is a diagram illustrating a relationship among regeneration release instruction COR, an intermediate link voltage EFC, an input current IS of a first power converter, and an operation control signal GC according to Embodiment 3.

This corresponds to a time T1 in FIG. 10 that illustrates a relationship among the restriction release instruction COR, the intermediate link voltage EFC, the input current IS of the first power converter, and the operation control signal GC.

In this figure, an example case is shown in which, up to the time T1, the flow of the regenerative power to the overhead line 105 is permitted. Hence, in this figure, the intermediate link voltage EFC is substantially constant up to the time T1. The operation controller 520 is outputting the ON-operation control signal GC. Hence, the first power converter 111 is operating. Accordingly, when the input current IS up to the time T1 is a positive value, the regenerative power PB generated by the induction motor 103 is smaller than the auxiliary source power PA, and thus power to be supplied to the auxiliary power-supply device 113 is taken from the overhead line 105.

Returning to FIG. 9, the operation controller 520 outputs the OFF-operation control signal GC in accordance with the regeneration release instruction COR obtained in the step S101. Hence, the operation controller 520 deactivates (step S102) the first power converter 111.

The operation controller 520 determines (step S103) whether or not the intermediate link voltage EFC is equal to or smaller than the setting value Ec by obtaining the EFC signal from the voltage detector 114.

When the intermediate link voltage EFC is not equal to or smaller than the setting value Ec (step S103: No), the operation controller 520 outputs the OFF-operation control signal GC, and keeps deactivating (step S102) the first power converter 111.

With reference to times T1 to T2 in FIG. 10, as explained above, the intermediate link voltage EFC gradually decreases since no power is taken from the overhead line 105 with the regenerative power PB being smaller than the auxiliary source power PA. In this case, the reason why the intermediate link voltage EFC does not sharply decrease is that power is supplied to the auxiliary power-supply device 113 by, for example, the filter capacitor 115. Since the first power converter 111 is deactivated, the input current IS is zero.

Returning to FIG. 9, when the intermediate link voltage EFC is equal to or smaller than the setting value Ec (step S103: Yes), there is a possibility that the auxiliary power-supply device 113 is shutdown due to the shortage of power when the intermediate link voltage EFC becomes smaller than the setting value Ec. Hence, the operation controller 520 outputs the ON-operation control signal GC to operate (step S104) the first power converter 111.

The operation controller 520 determines (step S105) whether or not the input current IS is larger than the setting value Ic by obtaining the input current signal from the current detector 551. When the input current IS is larger than the setting value Ic (step S105: Yes), the operation controller 520 outputs the ON-operation control signal GC to keep operating the first power converter 111 (step S104).

With reference to times T2 to T3 in FIG. 10, power to the auxiliary power-supply device 113, which is insufficient with only the regenerative power generated by the induction motor 103, is taken from the overhead line 105, and thus the input current IS gradually increases and the intermediate link voltage EFC recovers to a constant magnitude. Subsequently, the regenerative power PB generated by the induction motor 103 gradually increases, and the input current IS consequently becomes a negative value, and decreases to the setting value Ic. This means that the regenerative power flowing to the overhead line 105 reaches the restriction value Ps1.

Returning to FIG. 9, when the input current IS is equal to or smaller than the setting value Ic (step S105: No), the operation controller 520 outputs the OFF-operation control signal GC to deactivate (step S102) the first power converter 111.

With reference to times after T3 in FIG. 10, the input current IS becomes zero as the first power converter 111 deactivates, and no regenerative power flows to the overhead line 105. Since the regenerative power PB is larger than the auxiliary source power PA, the intermediate link voltage EFC maintains the constant magnitude.

As explained above, according to this Embodiment, the same advantageous effects as those of Embodiment 1 can be accomplished.

That is, since power that is equal to or larger than the auxiliary source power PA is supplied to the auxiliary power-supply device 113, it becomes possible to prevent the auxiliary power-supply device 113 from terminating the operation thereof. Also, it becomes possible to restrict regenerative power flowing to the overhead line 105 to be equal to or smaller than the restriction value Ps1. Still further, since the regenerative power generated by the induction motor 103 is supplied to the auxiliary power-supply device 113, power consumption by the electric motor car can be reduced.

Up to this paragraph, the explanation is given of Embodiment 3 of the present disclosure, but the following modifications may be made to Embodiment 3.

Modified Example 3

When, for example, the restriction value Ps1 is zero, the current detector 551 may detect only the direction of the current, and based on the detected direction of the current, the operation controller 520 may control the operation/deactivation of the first power converter 111.

According to this Modified Example, it becomes possible to prevent the auxiliary power-supply device 113 from terminating the operation thereof with a simpler structure than that of Embodiment 3. Also, it becomes possible to restrict regenerative power flowing to the overhead line 105 to be equal to or smaller than the restriction value Ps1 (=0), that is, it becomes possible to prevent the regenerative power from flowing to the overhead line 105. Still further, since the regenerative power generated by the induction motor 103 is supplied to the auxiliary power-supply device 113, power consumption by the electric motor car can be reduced.

Embodiments of the present disclosure were explained above, but the present disclosure is not limited to each of the aforementioned Embodiments. The respective Embodiments and Modified Examples thereof may be combined as needed, and a modification can be made thereto as needed.

INDUSTRIAL APPLICABILITY

The present disclosure is suitably applicable to a main conversion device loaded on an electric motor car, such as an electric railcar or an electric locomotive.

REFERENCE SIGNS LIST 100, 400, 500 Main conversion device
101 Pantograph
102 Main transformer
103 Induction motor
104 Load
105 Overhead line
111 First power converter
112 Second power converter
113 Auxiliary power-supply device
114 Voltage detector
115 Filter capacitor
116 APS power calculator
117 Speed detector
118 Torque pattern calculator
119 Regenerative power calculator
120, 220, 320, 420, 520 Operation controller
121 Intermediate link
131 Subtractor
132, 232, 332 Comparator
441 Operation control data
551 Current detector
552 Operation station

The invention claimed is:

1. A main conversion device for an electric motor car, the main conversion device comprising:
   a first power converter that is connected with a circuit with an overhead line through which an AC current flows, and an intermediate link that is a circuit through which a DC current flows, the first power converter mutually converting AC power and DC power;
   a second power converter that is connected with the intermediate link, and a circuit with an electric motor through which the AC current flows, the second power converter mutually converting the DC power and the AC power;
   an auxiliary power-supply device which receives power from the intermediate link, and which supplies the power to a load; and
   an operation controller that controls an operation/deactivation of the first power converter based on a value indicating an acceleration condition of the vehicle, a value in accordance with a vehicle speed, auxiliary source power that is necessary power for the auxiliary power-supply device to supply the power to the load, and a restriction value for regenerative power flowing to the overhead line in such a way that the power to be supplied to the auxiliary power-supply device becomes equal to or larger than the auxiliary source power, and the regenerative power flowing to the overhead line becomes equal to or smaller than the restriction value.

2. The electric motor car main conversion device according to claim 1, further comprising:
   a regenerative power calculator that calculates the regenerative power to be generated by the electric motor based on the value indicating the acceleration condition of the vehicle and the value in accordance with the vehicle speed; and
   an auxiliary source power calculator that calculates the auxiliary source power based on a voltage at the intermediate link and a current flowing in the auxiliary power-supply device,
   wherein the operation controller controls the operation/deactivation of the first power converter based on the regenerative power calculated by the regenerative power calculator and the auxiliary source power calculated by the auxiliary source power calculator.

3. The electric motor car main conversion device according to claim 2, wherein the operation controller comprises:
   a subtractor that subtracts the auxiliary source power calculated by the auxiliary source power calculator from the regenerative power calculated by the regenerative power calculator; and
   a comparator which compares a value calculated by the subtractor with the restriction value, and which controls the operation/deactivation of the first power converter based on the comparison result.

4. The electric motor car main conversion device according to claim 3, wherein the comparator deactivates the first power converter when the value calculated by the subtractor is larger than the restriction value.

5. The electric motor car main conversion device according to claim 3, wherein the comparator allows the first power converter to operate when the value calculated by the subtractor is equal to or smaller than the restriction value.

6. The electric motor car main conversion device according to claim 2, wherein the operation controller comprises a comparator which compares the regenerative power calculated by the regenerative power calculator with the auxiliary source power calculated by the auxiliary source power calculator, and which controls the operation/deactivation of the first power converter based on the comparison result.

7. The electric motor car main conversion device according to claim 1, wherein the operation controller:
   stores beforehand operation control data that associates a combination of the value indicating the acceleration condition of the vehicle and the value in accordance with the vehicle speed with either one of the operation and deactivation of the first power converter when the auxiliary source power is a preset value; and
   refers the value indicating the acceleration condition of the vehicle, the value in accordance with the vehicle speed, and the operation control data to control the operation/deactivation of the first power converter.

8. The electric motor car main conversion device according to claim 1, wherein the value indicating the acceleration condition of the vehicle is contained in a torque instruction, a notch instruction, or a brake signal of the vehicle.

9. A main conversion device for an electric motor car, the main conversion device comprising:
   a first power converter that is connected with a circuit with an overhead line through which an AC current flows, and an intermediate link that is a circuit through which a DC current flows, the first power converter mutually converting AC power and DC power;
   a second power converter that is connected with the intermediate link, and a circuit with an electric motor through which the AC current flows, the second power converter mutually converting the DC power and the AC power;
   an auxiliary power-supply device which receives power from the intermediate link, and which supplies the power to a load; and
   an operation controller which determines whether or not an intermediate link voltage that is a voltage at the intermediate link is equal to or smaller than a first setting value, and whether or not a current flowing through the first power converter toward the overhead line is larger than a second setting value, and which controls an operation/deactivation of the first power converter based on the determination result.

10. The electric motor car main conversion device according to claim 9, wherein the operation controller:
    allows the first power converter to operate when the intermediate link voltage is equal to or smaller than the first setting value; and
    deactivates the first power converter when the current flowing through the first power converter from the intermediate link toward the overhead line is equal to or larger than the second setting value.

11. The electric motor car main conversion device according to claim 9, wherein when obtaining an instruction indicating a restriction for a flow of regenerative power to the overhead line, the operation controller deactivates the first power converter.

* * * * *